United States Patent
Joo et al.

(10) Patent No.: US 10,151,874 B2
(45) Date of Patent: Dec. 11, 2018

(54) WAVELENGTH DIVISION MULTIPLEXER

(71) Applicant: ELECTRONICS AND TELECOMMUNICATIONS RESEARCH INSTITUTE, Daejeon (KR)

(72) Inventors: Jiho Joo, Sejong (KR); Myungjoon Kwack, Gimpo (KR); Gyungock Kim, Daejeon (KR); Jaegyu Park, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/792,550

(22) Filed: Oct. 24, 2017

(65) Prior Publication Data

US 2018/0113253 A1    Apr. 26, 2018

(30) Foreign Application Priority Data

Oct. 25, 2016  (KR) .................. 10-2016-0139493
Mar. 7, 2017   (KR) .................. 10-2017-0029147

(51) Int. Cl.
| | | |
|---|---|---|
| G02B 6/124 | (2006.01) | |
| G02B 6/02 | (2006.01) | |
| G02B 6/34 | (2006.01) | |
| G02F 1/19 | (2006.01) | |
| G02F 1/225 | (2006.01) | |
| G02F 1/01 | (2006.01) | |

(Continued)

(52) U.S. Cl.
CPC ..... *G02B 6/02085* (2013.01); *G02B 6/02095* (2013.01); *G02B 6/29323* (2013.01); *G02B 6/4203* (2013.01); *G02B 6/4215* (2013.01); *G02B 26/0833* (2013.01); *G02F 1/0147* (2013.01); *G02F 1/19* (2013.01); *G02F 1/225* (2013.01); *G02F 2201/307* (2013.01)

(58) Field of Classification Search
None
See application file for complete search history.

(56) References Cited

U.S. PATENT DOCUMENTS

| | | |
|---|---|---|
| 6,865,310 B2 | 3/2005 | Yokouchi |
| 7,492,990 B2 | 2/2009 | Hashiguchi et al. |

(Continued)

FOREIGN PATENT DOCUMENTS

| | | |
|---|---|---|
| JP | 2007-156254 A | 6/2007 |
| KR | 10-2008-0044070 A | 5/2008 |

*Primary Examiner* — Jerry Rahll (57) ABSTRACT

A wavelength division multiplexer is disclosed. The wavelength division multiplexer may include an input waveguide, in which a plurality of Bragg gratings for separating multiplexed optical signals into respective optical signals are provided, and a plurality of output waveguides connected to the input waveguide and configured to receive the optical signals separated by the plurality of Bragg gratings. The plurality of Bragg gratings may include a first Bragg grating including first protrusions each having a first width, and a second Bragg grating including second protrusions each having a second width larger than the first width. Each of the first and second protrusions may include a curved side surface, to which a corresponding one of the optical signals is incident.

10 Claims, 11 Drawing Sheets

(51) Int. Cl.
*G02B 6/42* (2006.01)
*G02B 6/293* (2006.01)
*G02B 26/08* (2006.01)

(56) References Cited

U.S. PATENT DOCUMENTS

| | | |
|---|---|---|
| 7,574,078 B2 | 8/2009 | Wagener et al. |
| 7,720,334 B1 * | 5/2010 | Mossberg .............. G02B 6/124 385/129 |
| 2008/0080804 A1 | 4/2008 | Kim et al. |
| 2008/0089644 A1 | 4/2008 | Lee et al. |

* cited by examiner

WAVELENGTH DIVISION MULTIPLEXER

CROSS-REFERENCE TO RELATED APPLICATIONS

This U.S. non-provisional patent application claims priority under 35 U.S.C. § 119 to Korean Patent Application Nos. 10-2016-0139493 and 10-2017-0029147, filed on Oct. 25, 2016 and Mar. 7, 2017, respectively, in the Korean Intellectual Property Office, the entire contents of which are hereby incorporated by reference.

BACKGROUND OF THE INVENTION

The present disclosure relates to a wavelength division multiplexer, and in particular, to a wavelength division multiplexer including a Bragg grating.

A wavelength division multiplexing (WDM) refers to an optical communication technology for increasing the number of signals to be transmitted through a single optical fiber. Since, in the WDM technology, several different wavelengths are used, it is possible to increase capacity of an optical transmission device by the number of used wavelengths. This makes it possible to reduce cost for a signal transmission system and to construct an efficient network system.

In the fields of optical communication and photonic integrated circuits, many studies have been conducted on the multiplexing and demultiplexing of optical signals. Recently, as an amount of data to be used for data communication increases, the need for research and development of a wavelength division multiplexer is increasing.

At present, an arrayed waveguide grating (AWG), a filter using a Mach-Zehnder interferometer, and an Echelle grating are used as typical WDM devices. To apply the wavelength division multiplexer to more application fields, it is important to reduce fabrication cost of the wavelength division multiplexer as much as possible, and for this, it is necessary to realize a wavelength division multiplexer that can be easily mass-produced. Furthermore, to allow the multiplexing and demultiplexing of optical signals to be performed with high efficiency, it is necessary to conduct a study on the wavelength division multiplexer with excellent optical characteristics.

SUMMARY

Some embodiments of the inventive concept provide a cost-effective wavelength division multiplexer with excellent optical characteristics.

According to some embodiments of the inventive concept, a wavelength division multiplexer may include an input waveguide, in which a plurality of Bragg gratings for separating multiplexed optical signals into respective optical signals are provided, and a plurality of output waveguides connected to the input waveguide and configured to receive the optical signals separated by the plurality of Bragg gratings. The plurality of Bragg gratings may include a first Bragg grating including first protrusions each having a first width, and a second Bragg grating including second protrusions each having a second width larger than the first width. Each of the first and second protrusions may include a curved side surface, to which a corresponding one of the optical signals is incident.

In some embodiments, the plurality of output waveguides may include a first output waveguide configured to receive an optical signal of a first wavelength, which is reflected from the first Bragg grating, and a second output waveguide configured to receive an optical signal of a second wavelength, which is reflected from the second Bragg grating. The second wavelength may be longer than the first wavelength.

In some embodiments, the first output waveguide and the second output waveguide may be connected to a side surface of the input waveguide and may be sequentially arranged in a length direction of the input waveguide, and each of the first and second output waveguides may extend in a direction crossing the length direction of the input waveguide.

In some embodiments, the first output waveguide may be connected to a side surface of the input waveguide, the second output waveguide may be connected to another side surface of the input waveguide opposite to the side surface, and each of the first and second output waveguides may extend in a direction crossing a length direction of the input waveguide.

In some embodiments, when viewed in a plan view, the curved side surface of the first protrusion may have a curvature center that is closer to the side surface of the input waveguide than to the another side surface of the input waveguide.

In some embodiments, the first Bragg grating may further include a first pattern interposed between adjacent ones of the first protrusions, and the first pattern may have a refractive index lower than that of the first protrusion.

In some embodiments, a width of the first pattern may be substantially equal to the first width of the first protrusion.

In some embodiments, the second Bragg grating may further include a second pattern interposed between adjacent ones of the second protrusions, and the second pattern may have a refractive index lower than that of the second protrusion.

In some embodiments, the second Bragg grating may be spaced apart from the first Bragg grating in a length direction of the input waveguide.

In some embodiments, the second output waveguide may be positioned between the first Bragg grating and the second Bragg grating.

In some embodiments, the wavelength division multiplexer may further include a substrate and a cladding layer on the substrate. The input waveguides and the output waveguides may be provided on the cladding layer, and the first protrusion and the second protrusion may be in contact with a top surface of the cladding layer.

In some embodiments, the wavelength division multiplexer may further include an upper cladding layer covering the input waveguides and the output waveguides. The cladding layer may be a lower cladding layer.

In some embodiments, the input waveguide may further include an input unit, to which the multiplexed optical signals are input, and a plate-shaped waveguide portion having a width larger than that of the input unit. The input unit may be connected to an end portion of the plate-shaped waveguide portion, and the first Bragg grating and the second Bragg grating may be provided in the plate-shaped waveguide portion and may be arranged in a length direction of the input waveguide.

In some embodiments, when viewed in a plan view, the plate-shaped waveguide portion may have a width increasing with increasing distance from the input unit.

In some embodiments, the plurality of output waveguides may be connected to the end portion of the plate-shaped waveguide portion.

BRIEF DESCRIPTION OF THE DRAWINGS

Example embodiments will be more clearly understood from the following brief description taken in conjunction

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
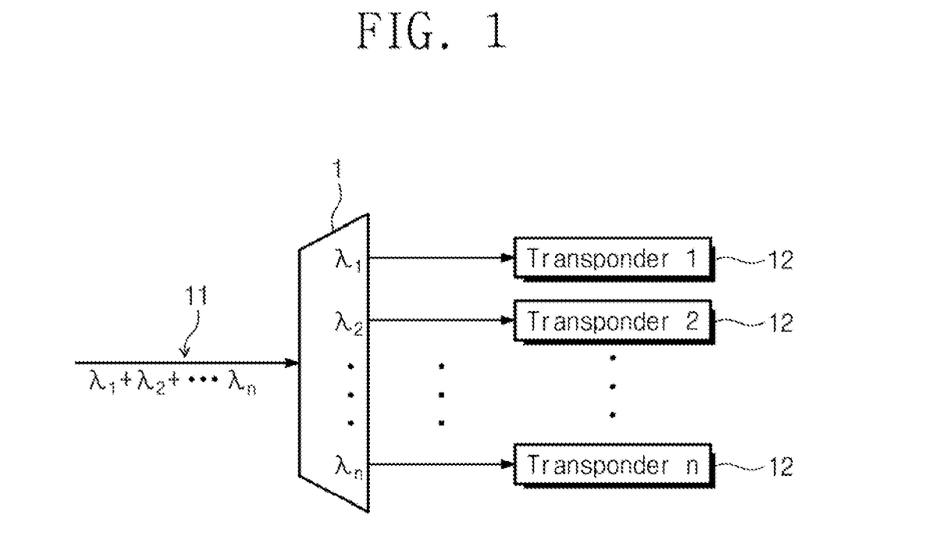
FIG. 1 is a schematic diagram illustrating a wavelength division multiplexing system.

FIG. 1 is a schematic diagram illustrating a wavelength division multiplexing system.

Referring to FIG. 1, a wavelength division multiplexing system may include a wavelength division multiplexer 1, an optical fiber 11, and a plurality of transponders 12. The wavelength division multiplexer 1 may be an optical multiplexer and/or an optical demultiplexer. The transponders 12 may be a transmitting and/or receiving device configured to perform a conversion operation between optical signals and electrical signals.

the optical fiber 11 and the transponders 12 may be connected to the wavelength division multiplexer 1. The wavelength division multiplexer 1 may be configured to perform an optical multiplexing operation or an optical demultiplexing operation. For example, in the case of the optical multiplexing operation, a plurality of optical signals having respective wavelengths may be input to the wavelength division multiplexer 1 through the transponders 12. If the optical signals are input to the wavelength division multiplexer 1, the optical signals may be multiplexed into optical signals with a plurality of wavelengths, in the wavelength division multiplexer 1, and then may be transmitted to the optical fiber 11.

By contrast, in the case of the optical demultiplexing operation, optical signals with a plurality of wavelengths may be input to the wavelength division multiplexer 1 through the optical fiber 11. If multiplexed optical signals are input to the wavelength division multiplexer 1, the multiplexed optical signals may be demultiplexed into optical signals with respectively different wavelengths, in the wavelength division multiplexer 1, and then may be transmitted to the transponders 12.

Figure 2:
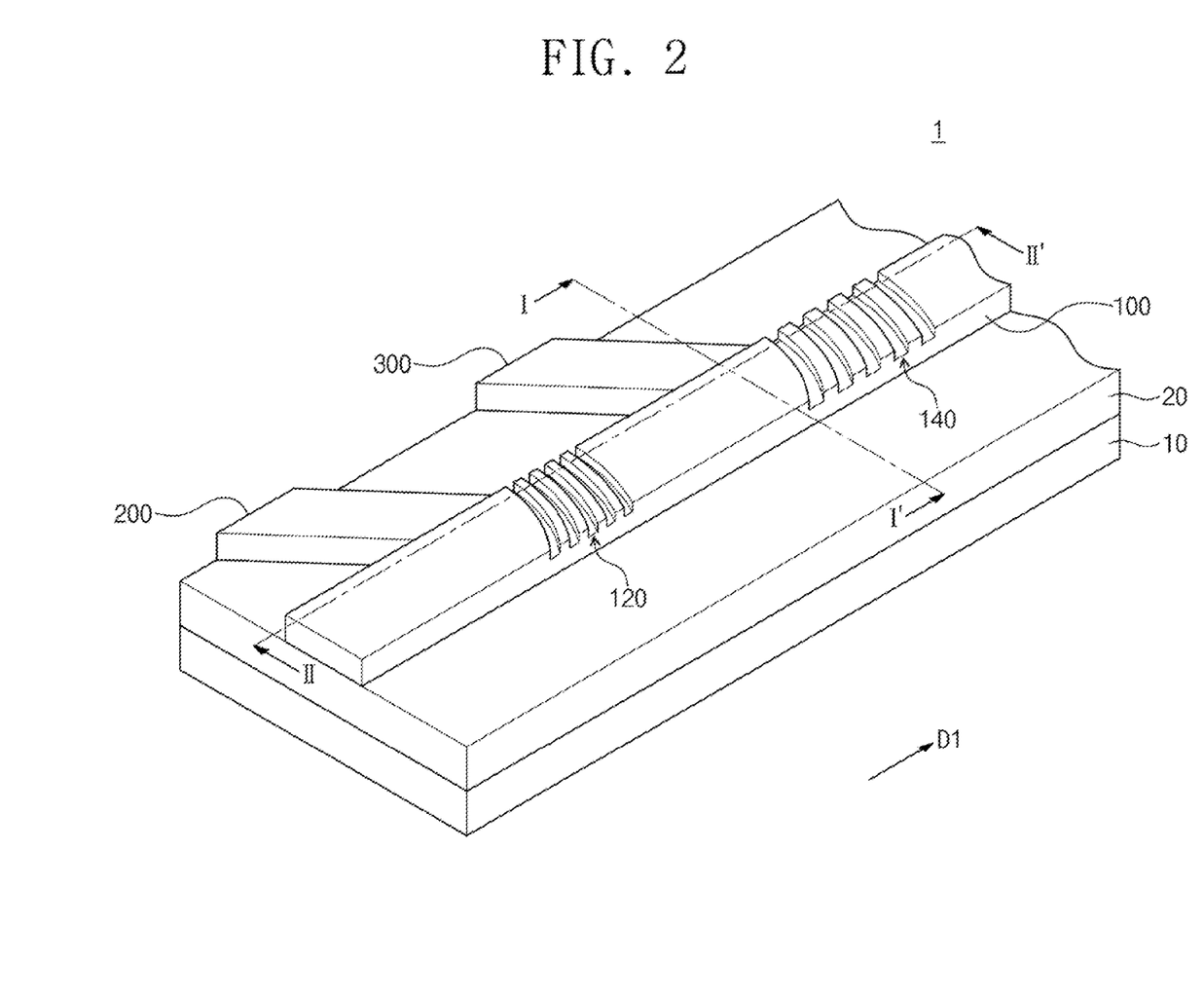
FIG. 2 is a perspective view illustrating a wavelength division multiplexer according to some embodiments of the inventive concept.
Figure 3:
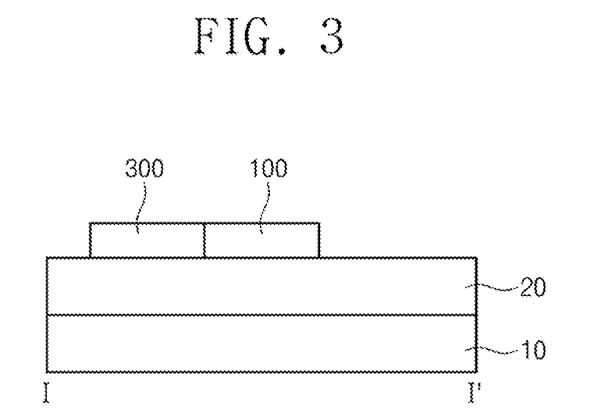
FIGS. 3 and 4 are sectional views taken along line I-I' of FIG. 2.
Figure 4:
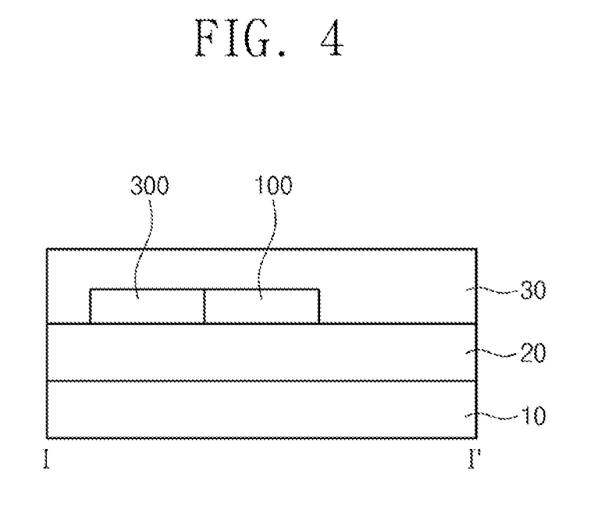
Figure 5:
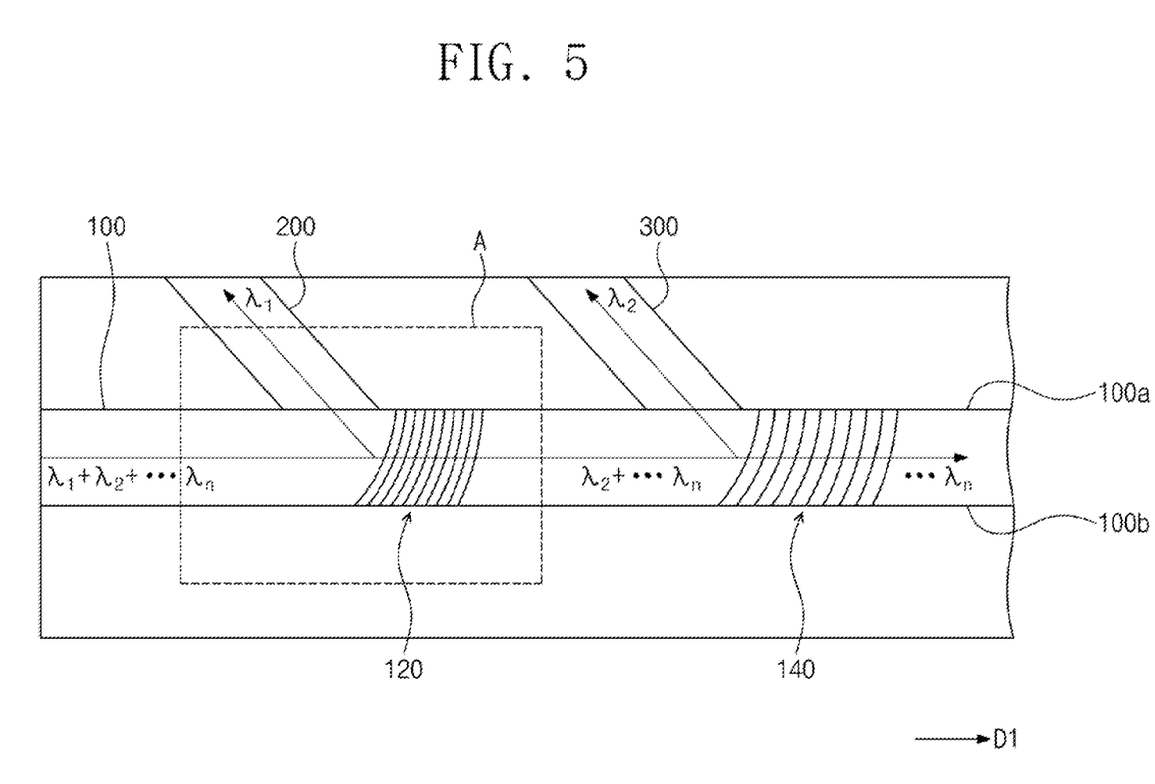
FIGS. 5 and 6 are plan views illustrating a wavelength division multiplexer according to some embodiments of the inventive concept.
Figure 6:
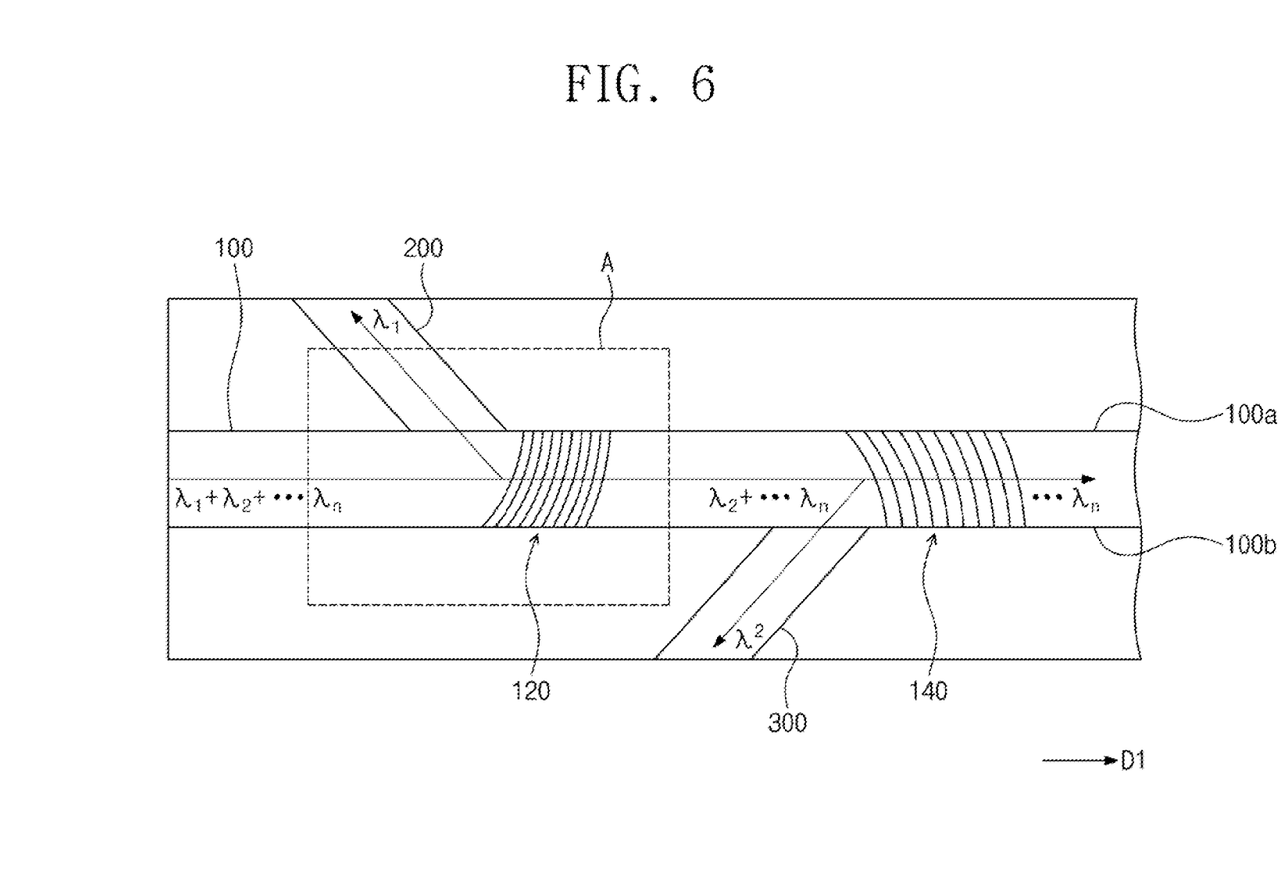

FIG. 2 is a perspective view illustrating a wavelength division multiplexer according to some embodiments of the inventive concept. FIGS. 3 and 4 are sectional views taken along line I-I' of FIG. 2. FIGS. 5 and 6 are plan views illustrating a wavelength division multiplexer according to some embodiments of the inventive concept.

Referring to FIGS. 2 and 3, the wavelength division multiplexer 1 may include a substrate 10, a lower cladding layer 20, an input waveguide 100, and a plurality of output waveguides 200 and 300. The substrate 10 may be a semiconductor substrate. For example, the substrate 10 may be formed of or include silicon. The substrate 10 may have a flat surface. The lower cladding layer 20 may be provided on the flat surface of the substrate 10. The lower cladding layer 20 may be formed of or include a silicon oxide layer (SiO2).

The input waveguide 100 and the output waveguides 200 and 300 may be placed on the lower cladding layer 20. The input waveguide 100 and the output waveguides 200 and 300 may be provided in the form of a Ridge waveguide, as shown in FIG. 3. For example, the input waveguide 100 and the output waveguides 200 and 300 may be provided to expose top and side surfaces thereof.

In certain embodiments, as shown in FIG. 4, the input waveguide 100 and the output waveguides 200 and 300 may be provided in the form of a channel waveguide. For example, an upper cladding layer 30 may be provided on the lower cladding layer 20. The upper cladding layer 30 may cover side and top surfaces of the input waveguide 100 and the output waveguides 200 and 300. The upper cladding layer 30 may be formed of or include the same material as the lower cladding layer 20.

Referring to FIG. 5, the input waveguide 100 may extend in a first direction D1 and may have a uniform width and a uniform height. The first direction D1 may be a length or extension direction of the input waveguide 100. The input waveguide 100 may be formed of or include at least one of silicon, silicon oxide, silicon nitride, silicon oxynitride, or tantalum oxide ($Ta_2O_5$). The input waveguide 100 may have a refractive index higher than that of the lower cladding layer 20. The input waveguide 100 may be configured to receive multiplexed optical signals from the outside.

In some embodiments, a plurality of output waveguides may be provided on a first side surface 100a of the input waveguide 100. For example, input waveguide 100 may be used to receive optical signals with n different wavelengths. n output waveguides may be provided on the side surface of the input waveguide 100. For convenience in illustration, only two ones of the n output waveguides (i.e., first and second output waveguides 200 and 300) are illustrated, and for the sake of simplicity, the description that follows will refer to such an example.

For example, some of the plurality of output waveguides (e.g., the first and second output waveguides 200 and 300) may be provided on the first side surface 100a of the input waveguide 100. Each of the first and second output waveguides 200 and 300 may be coupled to the input waveguide 100 and may be inclined at an angle relative to the first side surface 100a of the input waveguide 100. The first and second output waveguides 200 and 300 may be connected to the input waveguide 100, thereby forming a single body. The input waveguide 100 and the first and second output waveguides 200 and 300 may have substantially the same height. For example, the input waveguide 100 and the first and second output waveguides 200 and 300 may be a single object that is patterned by an etching process using a single mask pattern.

In certain embodiments, as shown in FIG. 6, some of the plurality of output waveguides may be provided on the first side surface 100a of the input waveguide 100, and the others of the plurality of output waveguides may be provided on a second side surface 100b of the input waveguide 100. For example, the first output waveguide 200 may be provided on the first side surface 100a of the input waveguide 100, and the second output waveguide 300 may be provided on the second side surface 100b of the input waveguide 100. Alternatively, the first output waveguide 200 may be provided on the second side surface 100b of the input waveguide 100, and the second output waveguide 300 may be provided on the first side surface 100a of the input waveguide 100.

In the case where the plurality of output waveguides are separately arranged at the first and second side surfaces 100a and 100b of the input waveguide 100, it may be possible to increase a distance between the output waveguides and to reduce optical noise in the output waveguides.

Referring back to FIG. 5, the input waveguide 100 may include a first Bragg grating 120 and a second Bragg grating 140. The first Bragg grating 120 and the second Bragg grating 140 may be arranged in the first direction D1. The first Bragg grating 120 and the second Bragg grating 140 may be spaced apart from each other. For example, the first Bragg grating 120 may be provided between the first and second output waveguides 200 and 300, in the input waveguide 100. The second Bragg grating 140 may be provided at the rear side of the second output waveguide 300. In detail, the first Bragg grating 120 may be provided adjacent to the first output waveguide 200 and may be used to output an optical signal of a first wavelength $\lambda_1$ to the first output waveguide 200. The second Bragg grating 140 may be provided adjacent to the second output waveguide 300 and may be used to output an optical signal of a second wavelength $\lambda_2$ to the second output waveguide 300. Hereinafter, the structures of the first and second Bragg gratings 120 and 140 will be described in more detail with reference to FIGS. 7 to 12.

Figure 7:
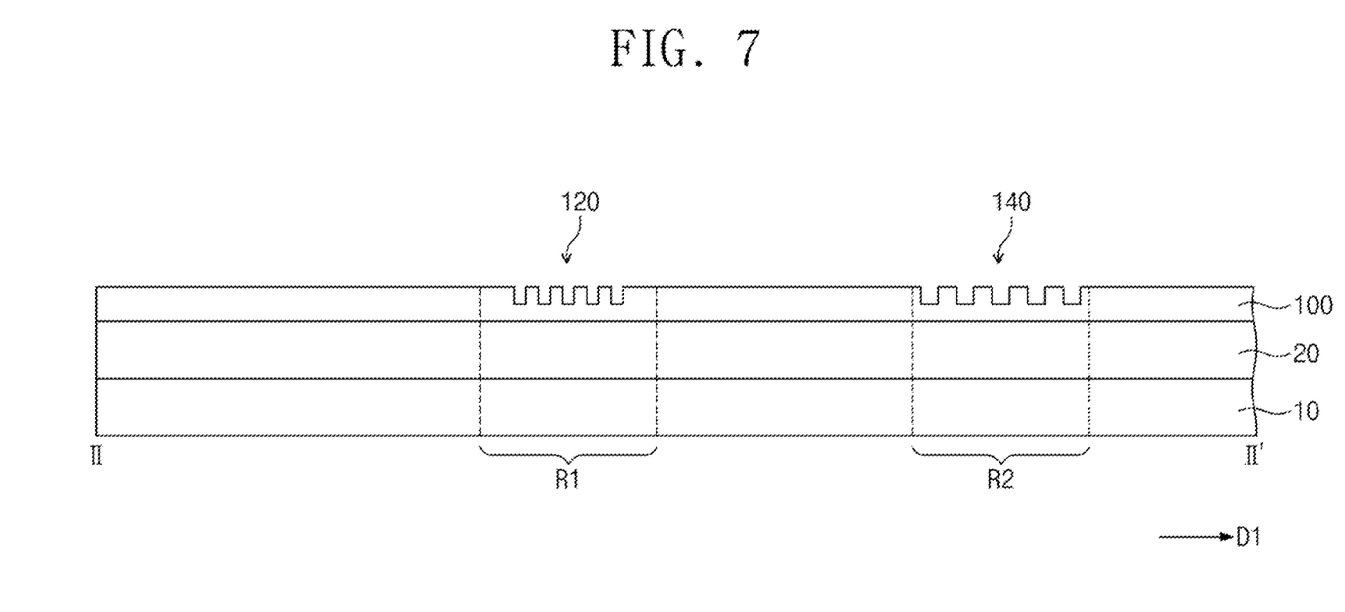
FIG. 7 is a sectional view taken along line II-II' of FIG. 2.
Figure 8:
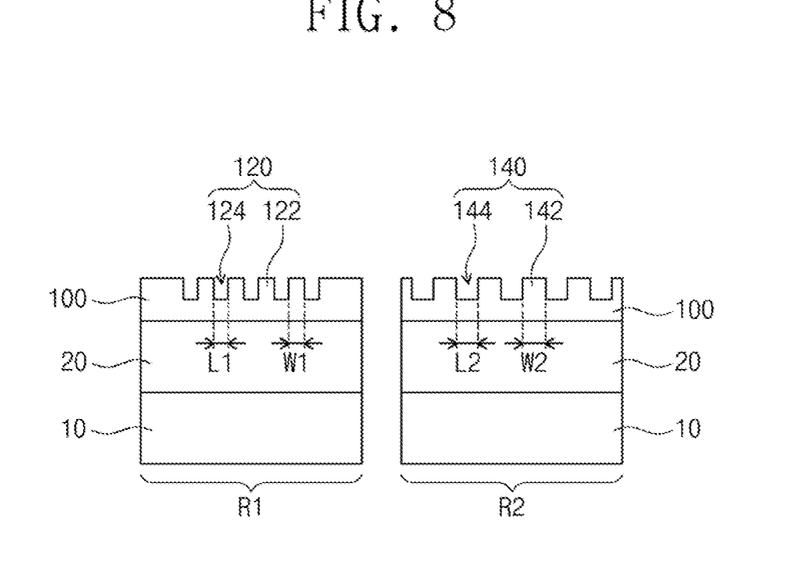
FIGS. 8 to 10 are enlarged sectional views illustrating portions 'R1' and 'R2' of FIG. 7.
Figure 9:
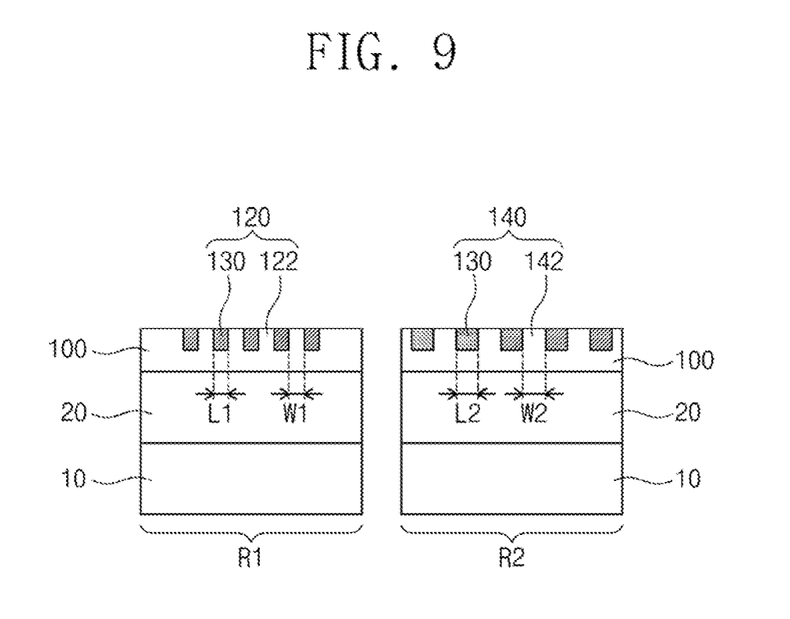
Figure 10:
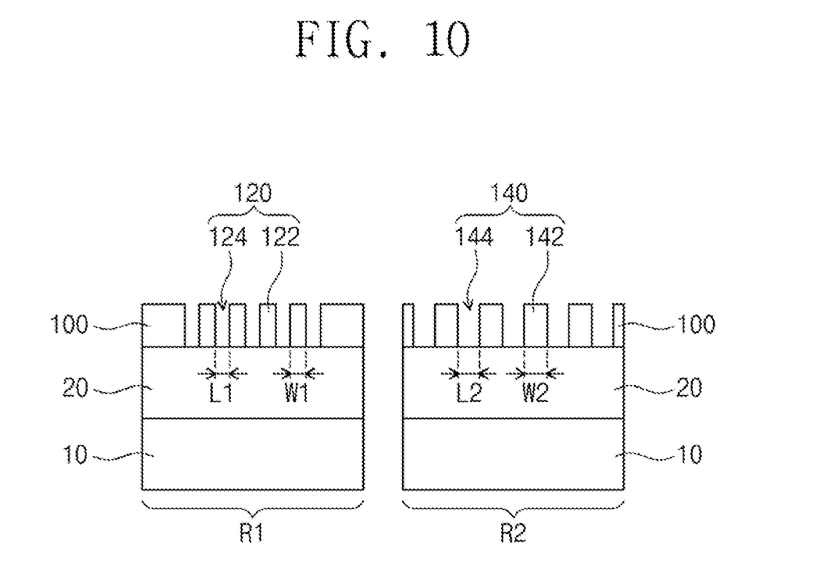

FIG. 7 is a sectional view taken along line II-II' of FIG. 2. FIGS. 8 to 10 are enlarged sectional views illustrating portions 'R1' and 'R2' of FIG. 7.

Referring to FIG. 7, the wavelength division multiplexer 1 may include a first reflection region R1 and a second reflection region R2. The first reflection region R1 may be configured to reflect the optical signal of the first wavelength $\lambda_1$ and allow for transmission of the optical signal of the second wavelength $\lambda_2$. The second reflection region R2 may be configured to reflect the optical signal of the second wavelength $\lambda_2$.

Referring to FIG. 8, the first Bragg grating 120 may be placed in the first reflection region R1. The second Bragg grating 140 may be placed in the second reflection region R2. Each of the first and second Bragg gratings 120 and 140 may be a structure, in which two different materials having different refractive indices are alternately arranged.

The first Bragg grating 120 may include first protrusions 122 and first recesses 124. The first protrusions 122 and the first recesses 124 may be alternately arranged to constitute the first Bragg grating 120. In some embodiments, the number of the first protrusions 122 in the first Bragg grating 120 may be from 30 to 50. The first protrusion 122 may have a uniform width W1 and may protrude in a direction normal to a top surface of the substrate 10. The first recess 124 may be positioned between the first protrusions 122. The first recess 124 may be provided in the form of a groove or trench. The first protrusions 122 may be spaced apart from each other by a first distance L1. That is, a width of the first recess 124 may be equal to the first distance L1. In some embodiments, the first recess 124 may be formed by etching a portion of the input waveguide 100. The first Bragg grating 120 may serve as a mirror reflecting light with the first wavelength $\lambda_1$.

The first Bragg grating 120 may serve as the mirror reflecting the light with the first wavelength $\lambda_1$, when the first protrusion 122 is configured to have the width W1 satisfying the following formula.

$$W = \lambda/4 * N_{material} * \cos(\theta) \quad \text{[Formula 1]}$$

Where W and $N_{material}$ are the width and the refractive index of the protrusion, and $\theta$ is an incidence angle of an optical signal to be incident into the Bragg grating. To increase reflectance and an extinction ratio of the Bragg grating, the width W1 of the first protrusion 122 may be given by a modified formula. For example, the modified formula may further include at least one constant or factor added in the formula 1.

In some embodiments, the first distance L1, a distance between the first protrusions 122, may be equal to the width W1 of the first protrusion 122, but the inventive concept is not limited thereto. For example, the first distance L1 may be adjusted to increase the reflectance and the extinction ratio of the first Bragg grating 120.

The second Bragg grating 140 may be provided in the input waveguide 100. The second Bragg grating 140 may be provided in the second reflection region R2 of the input waveguide 100. For concise description, description of the same or similar technical features as the first Bragg grating 120 may be omitted. The second Bragg grating 140 may include second protrusions 142 and second recesses 144. The second protrusions 142 and the second recesses 144 may be alternately arranged to constitute the second Bragg grating 140.

The second Bragg grating 140 may be configured to serve as a mirror reflecting light with the second wavelength $\lambda_2$. A width W2 of the second protrusion 142 may be larger than the width W1 of the first protrusion 122. Here, the formula 1 may also be used to obtain the width W2 of the second protrusion 142. A second distance L2, a distance between the second protrusions 142, may be equal to the width W2 of the second protrusion 142. For example, the second distance L2 may be larger than the first distance L1.

Since Bragg gratings, which are provided in an input waveguide and are arranged in a specific direction, include protrusions having at least two different widths, the Bragg gratings may be used to reflect optical signals of different wavelengths. Thus, it may be possible to realize a wavelength division multiplexer capable of performing a demultiplexing operation in a highly-efficient manner.

In certain embodiments, as shown in FIG. 9, first patterns 130 may be provided in the first and second recesses 124 and 144, respectively. In other words, the first patterns 130 and the first protrusions 122 may be alternately arranged to constitute the first Bragg grating 120. The first patterns 130 and the second protrusions 142 may be alternately arranged to constitute the second Bragg grating 140. The first patterns 130 may be formed of or include a material having a refractive index lower than that of the first protrusions 122. For example, the first pattern 130 may be formed of or include a material, which is selected from silicon, silicon oxide, silicon nitride, silicon oxynitride, or tantalum oxide ($Ta_2O_5$) and has a refractive index smaller than that of the first protrusion 122.

In certain embodiments, as shown in FIG. 10, the first and second recesses 124 and 144 may be provided to completely penetrate the input waveguide 100. For example, the first and second recesses 124 and 144 may be provided to expose a top surface of the lower cladding layer 20. In other words, a portion of the lower cladding layer 20 may be exposed by the first Bragg gratings 120 and the second Bragg gratings 140. The first protrusion 122 may be in contact with the top surface of the lower cladding layer 20. Although not shown, the first patterns 130 may be provided in the first and second recesses 124 and 144, respectively, as described with reference to FIG. 9. In this case, the first patterns 130 may also be in contact with the lower cladding layer 20.

Figure 11:
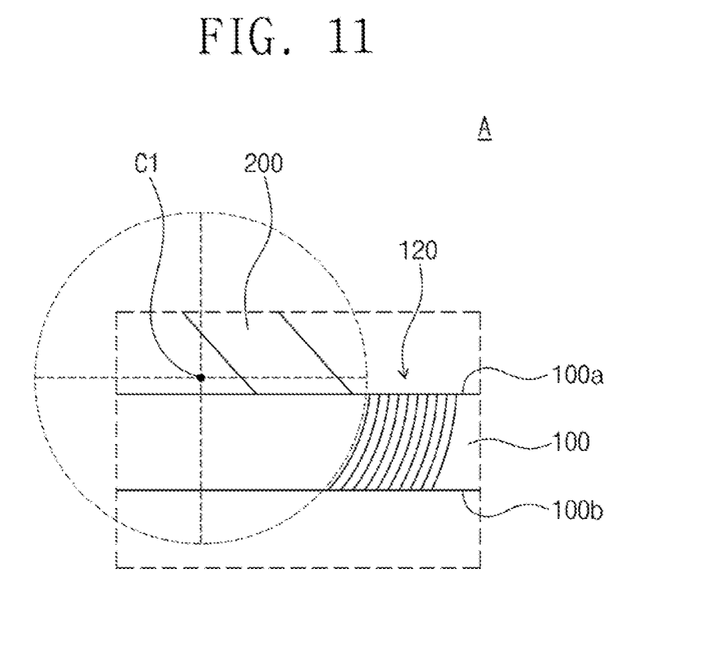
FIGS. 11 and 12 are enlarged views illustrating a portion 'A' of FIG. 5.
Figure 12:
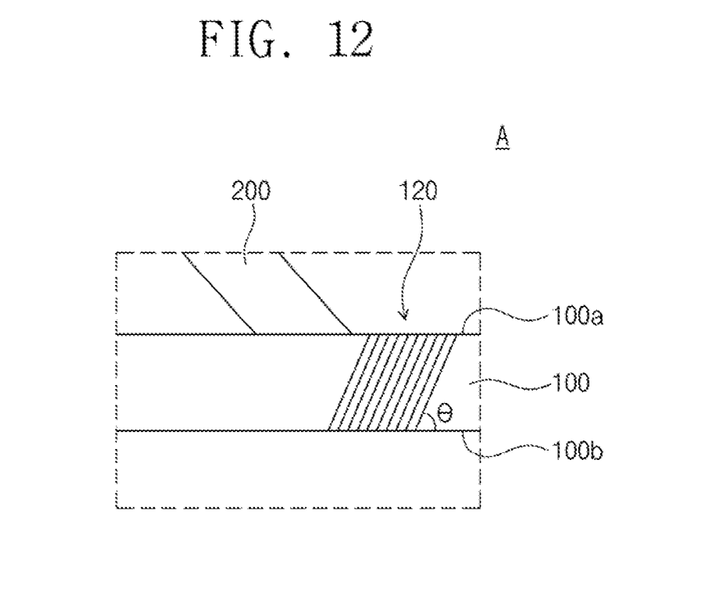

FIGS. 11 and 12 are enlarged views illustrating a portion 'A' of FIG. 5.

Referring to FIG. 11, a side surface of the first Bragg grating 120 may have a curved shape, when viewed in a plan view. For example, the first Bragg grating 120 may be configured to have protrusions and recesses, each of which has a curved side surface. A curvature center C1 of the curved side surface may be closer to the first side surface 100a of the input waveguide 100 than to the second side surface 100b. The curvature center may refer to a point that is spaced apart from the curved side surface curve by a curvature radius in a direction normal to a tangent surface of the curved side surface curve. The first Bragg grating 120 may be configured to reflect the light with the first wavelength $\lambda_1$ and to output the light toward the first output waveguide 200 in a condensed manner.

In certain embodiments, as shown in FIG. 12, the first Bragg grating 120 may include protrusions, each of which has a side surface inclined in a diagonal direction. In other words, unlike that described with reference to FIG. 11, the protrusions of the first Bragg grating 120 may be provided in the form of a straight line inclined at an angle to the first direction D1. The first Bragg grating 120 may be configured to reflect and output the light with the first wavelength $\lambda_1$ toward the first output waveguide 200. To reflect the optical signal of the first wavelength $\lambda_1$ propagating in the first direction D1 toward the first output waveguide 200, the first Bragg grating 120 may be inclined at an angle $\theta 1$ to the first direction D1. The first Bragg grating 120 may reflect the optical signal with the first wavelength in a direction that is inclined to the length direction of the input waveguide 100.

Referring back to FIG. 5, the wavelength division multiplexer 1 may be configured to perform a demultiplexing operation. Multiplexed optical signals with a plurality of wavelengths may be input to the input waveguide 100. In the input waveguide 100, the multiplexed optical signals may propagate in the first direction D1. A portion (e.g., an optical signal of the first wavelength $\lambda_1$) of the multiplexed optical signals may be selectively reflected by the first Bragg grating 120. The reflected optical signal of the first wavelength $\lambda_1$ may be output toward the first output waveguide 200. As shown in FIG. 11, in the case where the first Bragg grating 120 has a curved side surface in a plan view, the optical signal of the first wavelength $\lambda_1$ may be input into the first output waveguide 200 in a single mode. In other words, in the case where the first Bragg grating 120 is provided in the form of a concave mirror with a specific curvature, it may be possible to prevent a multimode from occurring.

Except for the optical signal of the first wavelength $\lambda_1$, all of the multiplexed optical signals may pass through the first Bragg grating 120. A portion (e.g., an optical signal of the second wavelength $\lambda_2$) of the multiplexed optical signals passed through the first Bragg grating 120 may be selectively reflected by the second Bragg grating 140. The reflected optical signal of the second wavelength $\lambda_2$ may be output toward the second output waveguide 300. The optical signal of the first wavelength $\lambda_1$ may be input to the first output waveguide 200. Unlike that shown in FIG. 5, the wavelength division multiplexer 1 may further include n Bragg gratings and n output waveguides, which are provided at the rear side of the second Bragg grating 140. The multiplexed optical signals passed through the first and second Bragg gratings 120 and 140 may be reflected by one of the additional Bragg gratings (not shown) provided at the rear side of the second Bragg grating 140. The reflected optical signal may be input to a corresponding one of the additional output waveguides (not shown) provided at the rear side of the second Bragg grating 140.

Referring back to FIG. 5, the wavelength division multiplexer 1 may be configured to perform a multiplexing operation. An optical signal of the first wavelength $\lambda_1$ may be input to the first output waveguide 200. An optical signal of the second wavelength $\lambda_2$ may be input to the second output waveguide 300. The optical signal of the first wavelength $\lambda_1$ may be reflected by the first Bragg grating 120 and then may propagate in an opposite direction of the first direction D1. The optical signal of the second wavelength $\lambda_2$ may be reflected by the second Bragg grating 140 and then may propagate in the opposite direction of the first direction D1. The optical signal of the second wavelength $\lambda_2$ may pass through the first Bragg grating 120. The optical signal of the first wavelength $\lambda_1$ and the optical signal of the second wavelength $\lambda_2$ may be coupled without interference and then may be output to a single optical fiber (not shown) that is provided outside the wavelength division multiplexer 1.

Figure 13:
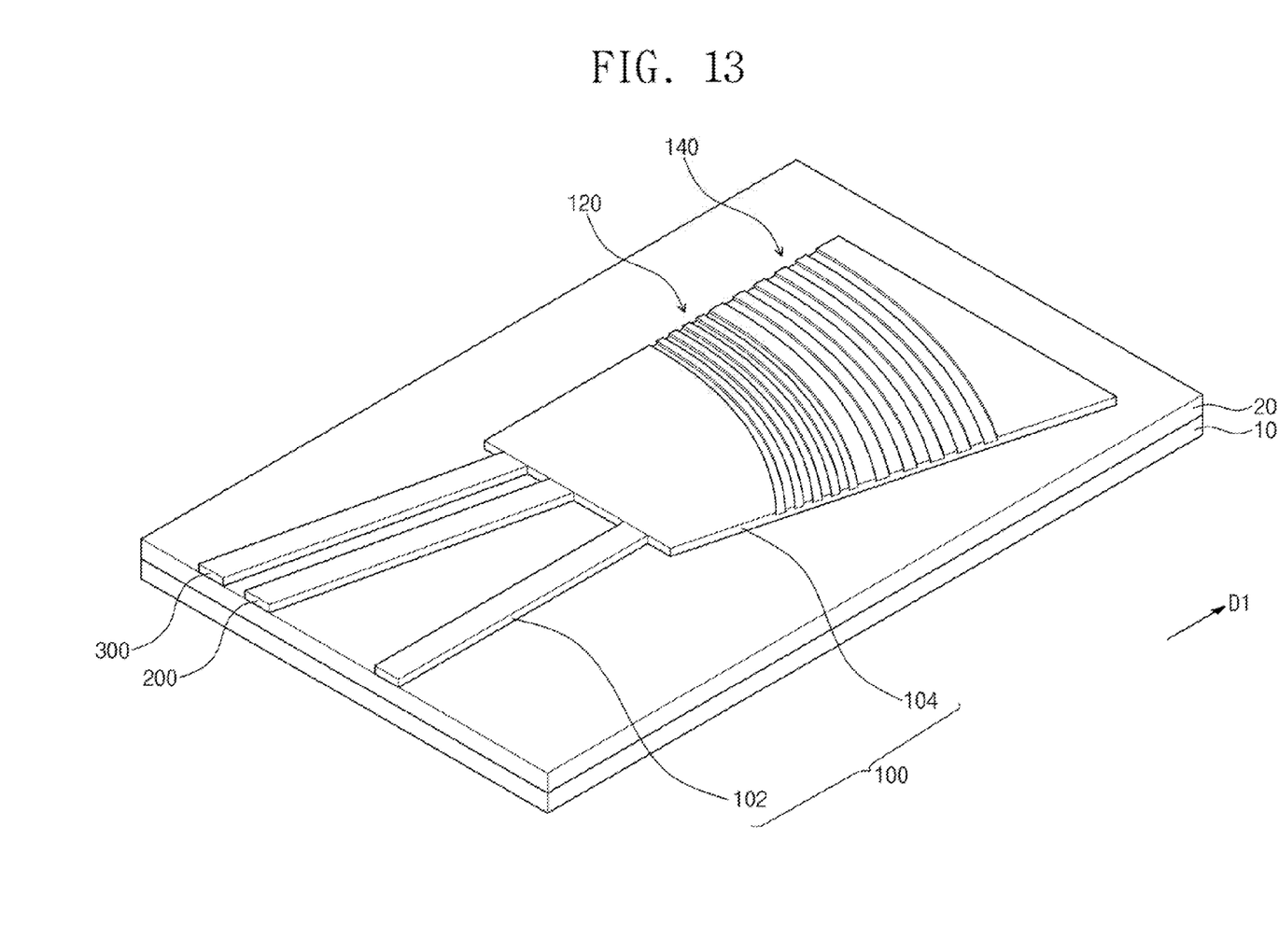
FIG. 13 is a perspective view illustrating a wavelength division multiplexer according to some embodiments of the inventive concept.
Figure 14:
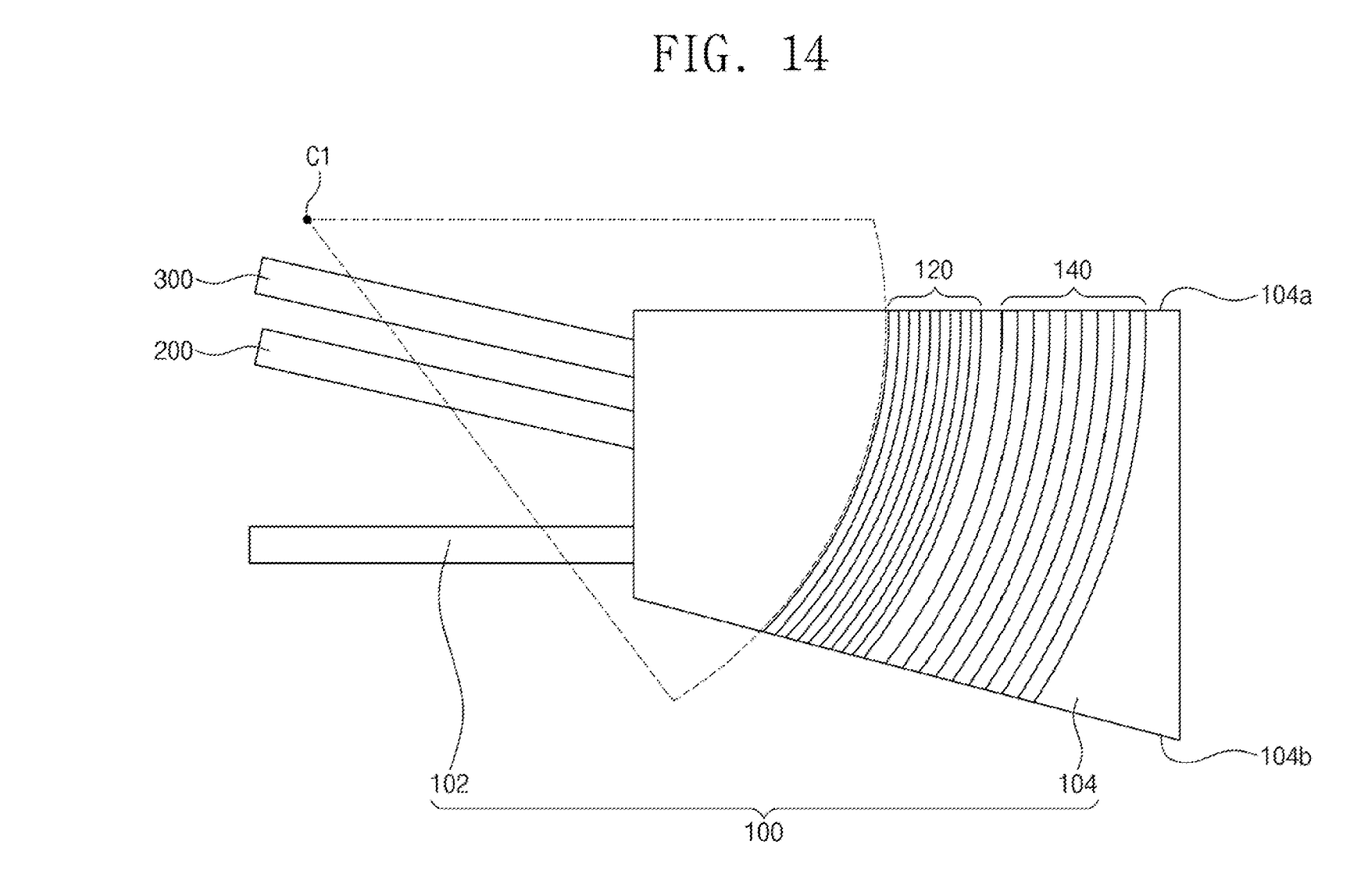
FIG. 14 is a plan view illustrating a wavelength division multiplexer according to some embodiments of the inventive concept.

FIG. 13 is a perspective view illustrating a wavelength division multiplexer according to some embodiments of the inventive concept. FIG. 14 is a plan view illustrating a wavelength division multiplexer according to some embodiments of the inventive concept.

For concise description, an element previously described with reference to FIGS. 2 to 12 may be identified by a similar or identical reference number without repeating an overlapping description thereof.

Referring to FIGS. 13 and 14, the wavelength division multiplexer 1 may include the input waveguide 100 and a plurality of the output waveguides 200 and 300. The input waveguide 100 may be provided on the lower cladding layer 20. The input waveguide 100 may include an input unit 102 and a plate-shaped waveguide portion 104. The input unit 102 may have a uniform width and a uniform height and may extend parallel to the first direction D1.

The plate-shaped waveguide portion 104 may be provided at an end of the input unit 102. When viewed in a plan view, the plate-shaped waveguide portion 104 may have a right trapezoid shape with two opposite sides (e.g., a side adjacent to the input unit 102 and another side opposite thereto). The plate-shaped waveguide portion 104 may have a width increasing with increasing distance from the input unit 102. The first side surface 104a of the plate-shaped waveguide portion 104 may be parallel to the first direction D1. In other words, the first side surface 104a of the plate-shaped waveguide portion 104 may be parallel to the input unit 102. The second side surface 104b of the plate-shaped waveguide portion 104 may be inclined at an angle to the first direction D1 and the input unit 102. The plate-shaped waveguide portion 104 may have a uniform height. The input unit 102 and the plate-shaped waveguide portion 104 may be formed of or include the same material as that of the input waveguide 100 described with reference to FIG. 2.

The plate-shaped waveguide portion 104 may include the first and second Bragg gratings 120 and 140. The first and second Bragg gratings 120 and 140 may be arranged in the plate-shaped waveguide portion 104 and in the first direction D1. The first and second Bragg gratings 120 and 140 may be spaced apart from each other. A distance between the first and second Bragg gratings 120 and 140 may be smaller than a distance between the first and second Bragg gratings 120 and 140 described with reference to FIG. 2.

Each of the first and second Bragg gratings 120 and 140 may have a curved side surface, when viewed in a plan view. For example, each of the first and second Bragg gratings 120 and 140 may be configured to have protrusions and recesses, each of which has a curved side surface. The curvature center C1 of the curved side surface may be closer to the first side surface 100a of the plate-shaped waveguide portion 104 than to the second side surface 100b of the plate-shaped waveguide portion 104.

The first and second output waveguides 200 and 300 may be provided on a surface of the input waveguide 100. In some embodiments, the first and second output waveguides 200 and 300 may be provided on the surface of the plate-shaped waveguide portion 104 and may be inclined at an angle to the first direction D1. For example, the first and second output waveguides 200 and 300 may be parallel to the second side surface 100b of the plate-shaped waveguide portion 104. The first and second output waveguides 200 and 300 may be positioned adjacent to the first side surface 100a of the plate-shaped waveguide portion 104, when compared with a position of the input unit 102.

The first and second output waveguides 200 and 300 may be in contact with the plate-shaped waveguide portion 104. End portions of the first and second output waveguides 200 and 300 in contact with the plate-shaped waveguide portion 104 may be provided to have bottoms that are coplanar with that of an end portion of the input unit 102 in contact with the plate-shaped waveguide portion 104. The input waveguide 100 and the output waveguides 200 and 300 may have the same height. The input waveguide 100 and the output waveguides 200 and 300 may be connected to each other, thereby forming a single object. For example, the input waveguide 100 and the output waveguides 200 and 300 may be a single structure that is formed or patterned by the same etching process.

According to some embodiments of the inventive concept, a wavelength division multiplexer may include a Bragg grating configured to reflect an optical signal of a specific wavelength, and thus, it may be possible to reduce optical loss, which is caused by optical coupling in multiplexing and demultiplexing operations, and to realize a high extinction ratio.

According to some embodiments of the inventive concept, a wavelength division multiplexer may include a Bragg grating with a curve side surface, when viewed in a plan view. This makes it possible to output an optical signal, which is input through an input waveguide, to an output waveguide, while maintaining a single mode.

According to some embodiments of the inventive concept, a wavelength division multiplexer may include an input waveguide and an output waveguide that are connected to each other to form a single object. Accordingly, it may be possible to realize a cost-effective wavelength division multiplexer that can be mass-produced.

According to some embodiments of the inventive concept, Bragg gratings, which are configured to reflect respective optical signals with different wavelengths, are arranged in an input waveguide and in a specific direction. This make it possible to realize a wavelength division multiplexer capable of performing multiplexing and demultiplexing operations with high efficiency operation.

According to some embodiments of the inventive concept, a side surface of the Bragg grating is provided to have a curved shape, when viewed in a plan view, and thus, an optical signal input through the input waveguide may be output to an output waveguide, while maintaining a single mode. Accordingly, it may be possible to realize a wavelength division multiplexer, which can have low optical loss and have a high extinction ratio in multiplexing and demultiplexing operations.

While example embodiments of the inventive concepts have been particularly shown and described, it will be understood by one of ordinary skill in the art that variations in form and detail may be made therein without departing from the spirit and scope of the attached claims.

What is claimed is:

1. A wavelength division multiplexer, comprising:
    an input waveguide, in which a plurality of Bragg gratings for separating multiplexed optical signals into respective optical signals are provided; and
    a plurality of output waveguides connected to the input waveguide and configured to receive the optical signals separated by the plurality of Bragg gratings,
    wherein the plurality of Bragg gratings comprise:
    a first Bragg grating comprising first protrusions each having a first width; and
    a second Bragg grating comprising second protrusions each having a second width larger than the first width,
    wherein each of the first and second protrusions comprises a curved side surface, to which a corresponding one of the optical signals is incident, and
    wherein the input waveguide further comprises:
    an input unit, to which the multiplexed optical signals are input; and
    a plate-shaped waveguide portion having a width larger than that of the input unit,
    wherein the input unit is connected to an end portion of the plate-shaped waveguide portion, and
    the first Bragg grating and the second Bragg grating are provided in the plate-shaped waveguide portion and are arranged in a length direction of the input waveguide.

2. The wavelength division multiplexer of claim 1, wherein the plurality of output waveguides comprise:
    a first output waveguide configured to receive an optical signal of a first wavelength, which is reflected from the first Bragg grating; and
    a second output waveguide configured to receive an optical signal of a second wavelength, which is reflected from the second Bragg grating,
    wherein the second wavelength is longer than the first wavelength.

3. The wavelength division multiplexer of claim 1, wherein the first Bragg grating further comprises a first pattern interposed between adjacent ones of the first protrusions, and
    the first pattern has a refractive index lower than that of the first protrusion.

4. The wavelength division multiplexer of claim 3, wherein a width of the first pattern is substantially equal to the first width of the first protrusion.

5. The wavelength division multiplexer of claim 1, wherein the second Bragg grating further comprises a second pattern interposed between adjacent ones of the second protrusions, and
    the second pattern has a refractive index lower than that of the second protrusion.

6. The wavelength division multiplexer of claim 1, wherein the second Bragg grating is spaced apart from the first Bragg grating in a length direction of the input waveguide.

7. The wavelength division multiplexer of claim 1, further comprising:
    a substrate; and
    a cladding layer on the substrate,
    wherein the input waveguides and the output waveguides are provided on the cladding layer, and
    the first protrusion and the second protrusion are in contact with a top surface of the cladding layer.

8. The wavelength division multiplexer of claim 7, further comprising an upper cladding layer covering the input waveguides and the output waveguides,
    wherein the cladding layer is a lower cladding layer.

9. The wavelength division multiplexer of claim 1, wherein, when viewed in a plan view, the plate-shaped waveguide portion has a width increasing with increasing distance from the input unit.

10. The wavelength division multiplexer of claim 9, wherein the plurality of output waveguides are connected to the end portion of the plate-shaped waveguide portion.

* * * * *